(12) United States Patent
Kondo et al.

(10) Patent No.: US 7,135,099 B2
(45) Date of Patent: *Nov. 14, 2006

(54) WATER TREATING METHOD AND WATER TREATING SYSTEM

(75) Inventors: Yasuhito Kondo, Ora-gun (JP); Masahiro Iseki, Ota (JP)

(73) Assignee: Sanyo Electric Co. Ltd., Moriguchi (JP)

( * ) Notice: Subject to any disclaimer, the term of this patent is extended or adjusted under 35 U.S.C. 154(b) by 638 days.

This patent is subject to a terminal disclaimer.

(21) Appl. No.: 10/282,220

(22) Filed: Oct. 29, 2002

(65) Prior Publication Data

US 2003/0091469 A1   May 15, 2003

(30) Foreign Application Priority Data

Oct. 31, 2001   (JP)   ............................. 2001-334993

(51) Int. Cl.
  *C02F 1/461* (2006.01)
(52) U.S. Cl. ............................. 204/230.2; 204/275.1; 204/276

(58) Field of Classification Search ............. 204/230.2, 204/275.1, 276
See application file for complete search history.

(56) References Cited

U.S. PATENT DOCUMENTS 5,314,589 A * 5/1994 Hawley ...................... 205/618

\* cited by examiner

*Primary Examiner*—Arun S. Phasge
(74) *Attorney, Agent, or Firm*—Armstrong, Kratz, Quintos, Hanson & Brooks, LLP.

(57) ABSTRACT

In a circulation system of treatment-object water (waste water), a water treating apparatus and a pH adjuster are provided. A carbon fiber that can collect at least microorganisms is disposed in the water treating apparatus. The carbon fiber is immersed in the treatment-object water, and potential is applied to the carbon fiber. Further, pH of the treatment-object water is adjusted by the pH adjuster in a direction in which adsorption of microorganisms in the treatment-object water to the carbon fiber is facilitated. As a result, the microorganisms are strongly attracted and adsorbed to the carbon fiber.

6 Claims, 9 Drawing Sheets

WATER TREATING METHOD AND WATER TREATING SYSTEM

BACKGROUND OF THE INVENTION

The present invention relates to a method and apparatus for sterilizing treatment-object water such as waste water discharged from fish farms, food and drink manufacturing facilities, or the like.

When removing microorganisms such as bacteria, molds or protozoa contained in waste water, the following method has been carried out, wherein a porous filter member that can collect such microorganisms is arranged in a water passage, so that the microorganisms are adhered or adsorbed to the filter member to be captured, thereby to purify the waste water.

There has been a further method, wherein electrodes are additionally inserted in the waste water for electrolysis to produce chlorine or ozone, thereby to exterminate the microorganisms contained in the waste water by the bactericidal action thereof.

However, such a filter member collects the microorganisms by receiving them in fine holes formed on the surface thereof, and thus, unless the microorganisms collide with the surface of the filter member or pass nearby, they can not be adsorbed thereto to be captured. Therefore, there has been an inevitable limit to the microorganism capturing effect.

Further, since the microorganisms are adsorbed to the filter member as noted above, the filter member eventually becomes saturated to release or discharge the microorganisms into the water passage. In view of this, it is considered to annihilate the adsorbed microorganisms by, for example, heating the filter member. However, there are those microorganisms that have resistance to heat. Thus, for securing the sterilizing effect, the filter member should be heated to a relatively high temperature.

Normally, microorganisms in a solution are charged at negative potential (reference literature: Masaki Matsuo, "Fundamentals and Application Technique of Electrolytic Water", Gihodo Shuppan Co., Ltd.). This charging rate, however, is influenced by pH of the solution. Specifically, as alkalinity of the solution increases, the negative potential charging rate of the microorganisms increases, while, as acidity thereof increases, the positive potential charging rate increases (reference literature: "Conn Stumpf Biochemistry" 5th edition, Tokyo Kagaku Dozin Co., Ltd.). This state of things can be expressed by Chemical Formula 1 representing protein of the surface of a microorganism.

[Chemical Formula 1]

The reason is that, since $H^+$ are few in an alkaline solution, $H^+$ of protein are separated, so that as alkalinity of the solution increases, the negative potential charging rate of protein increases. On the other hand, since $H^+$ are plentiful in an acidic solution, $H^+$ are added to protein, so that as acidity increases, the positive potential charging rate of protein increases.

On the other hand, spore bacteria and yeasts (microorganisms) do not die out, but can survive even in, for example, strong alkaline or acidic water. FIG. 7 shows the survival rate of spore bacteria, wherein the axis of abscissas represents pH, and wherein L1 shows results after a lapse of one hour, while L2 shows results after a lapse of 24 hours. As clear from FIG. 7, it is seen that spore bacteria can survive even in a strong alkaline state of pH 12 or a strong acidic state of pH 2. FIG. 8 shows the number of bacteria of yeasts in a solution, wherein the axis of abscissas represents pH, and wherein L3 shows results after a lapse of one hour, while L4 shows results after a lapse of 24 hours. As clear from FIG. 8, it is seen that yeasts can also survive even in a strong alkaline state of pH 12 or a strong acidic state of pH 2. It is considered that the negative potential charging rate of microorganisms is quite high in the foregoing strong alkaline environment. Accordingly, if such a charging rate of microorganisms is controlled by adjusting pH, it is expected to efficiently collect microorganisms using electric charge of the microorganisms.

On the other hand, as the temperature of a solution increases, microorganisms in the solution become more active and more easily movable. Accordingly, by adjusting the temperature of the solution, it is also expected to enhance the collecting efficiency of the microorganisms.

SUMMARY OF THE INVENTION

Therefore, the present invention has been made for solving the foregoing conventional technical problems, and has an object to provide a water treating method and a water treating system that can significantly improve the effect of removal of microorganisms in waste water or the like.

According to the present invention, there is provided a water treating method comprising immersing a conductor in treatment-object water, the conductor being capable of collecting at least microorganisms; applying a potential to the conductor; and adjusting pH of the treatment-object water in a direction in which adsorption of microorganisms in the treatment-object water to the conductor is facilitated.

Further, in the present invention, there is provided a water treating method wherein pH of the treatment-object water represents an alkaline state.

Further, in the present invention, there is provided a water treating method comprising immersing a conductor in treatment-object water, the conductor being capable of collecting at least microorganisms; applying a potential to the conductor; and adjusting a temperature of the treatment-object water in a direction in which adsorption of microorganisms in the treatment-object water to the conductor is facilitated.

Further, in the present invention, there is provided a water treating method wherein the method comprising a first processing step of immersing an electrode and the conductor in a flow passage of the treatment-object water, applying a positive potential to the conductor, and applying a negative potential to the electrode, thereby to cause the microorganisms to be adsorbed to the conductor; a second processing step of, after finishing the first processing step, stopping circulation of the treatment-object water, and increasing the potentials applied to the conductor and the electrode in the presence of the treatment-object water while maintaining polarities of the potentials applied to the conductor and the electrode, thereby to cause electrolysis of the treatment-object water; and a third processing step of, after finishing the second processing step, applying AC voltage across the electrode and the conductor in the presence of the treatment-object water.

Further, in the present invention, there is provided a water treating method wherein the method comprising a first processing step of immersing an electrode and the conductor in a flow passage of the treatment-object water, applying a positive potential to the conductor, and applying a negative potential to the electrode, thereby to cause the microorganisms to be adsorbed to the conductor; a second processing step of, after finishing the first processing step, stopping circulation of the treatment-object water, and increasing the potentials applied to the conductor and the electrode in the presence of the treatment-object water while inverting polarities of the potentials applied to the conductor and the electrode, thereby to cause electrolysis of the treatment-object water; and a third processing step of, after finishing the second processing step, applying AC voltage across the electrode and the conductor in the presence of the treatment-object water.

Further, in the present invention, there is provided a water treating method wherein the treatment-object water is heated by a heater in the third processing step.

Further, in the present invention, there is provided a water treating method wherein the method comprising a first processing step of immersing an electrode and the conductor in a flow passage of the treatment-object water, applying a positive potential to the conductor, and applying a negative potential to the electrode, thereby to cause the microorganisms to be adsorbed to the conductor; a second processing step of, after finishing the first processing step, stopping circulation of the treatment-object water, and increasing the potentials applied to the conductor and the electrode in the presence of the treatment-object water while maintaining polarities of the potentials applied to the conductor and the electrode, thereby to cause electrolysis of the treatment-object water; and a third processing step of, after finishing the second processing step, heating the treatment-object water by a heater.

Further, in the present invention, there is provided a water treating method wherein the method comprising a first processing step of immersing an electrode and the conductor in a flow passage of the treatment-object water, applying a positive potential to the conductor, and applying a negative potential to the electrode, thereby to cause the microorganisms to be adsorbed to the conductor; a second processing step of, after finishing the first processing step, stopping circulation of the treatment-object water, and increasing the potentials applied to the conductor and the electrode in the presence of the treatment-object water while inverting polarities of the potentials applied to the conductor and the electrode, thereby to cause electrolysis of the treatment-object water; and a third processing step of, after finishing the second processing step, heating the treatment-object water by a heater.

Further, in the present invention, there is provided a water treating system comprising a conductor capable of collecting at least microorganisms and immersed in treatment-object water; a pH adjuster for adjusting pH of the treatment-object water; and a controller for controlling application of a potential to the conductor and controlling the pH adjuster, wherein the controller controls the pH adjuster to adjust pH of the treatment-object water in a direction in which adsorption of microorganisms in the treatment-object water to the conductor is facilitated.

Further, in the present invention, there is provided a water treating system wherein the controller controls the pH adjuster to adjust pH of the treatment-object water to an alkaline state.

Further, in the present invention, there is provided a water treating system comprising a conductor capable of collecting at least microorganisms and immersed in treatment-object water; a temperature adjuster for adjusting a temperature of the treatment-object water; and a controller for controlling application of a potential to the conductor and controlling the temperature adjuster, wherein the controller controls the temperature adjuster to adjust the temperature of the treatment-object water in a direction in which adsorption of microorganisms in the treatment-object water to the conductor is facilitated.

Further, in the present invention, there is provided a water treating system further comprising an electrode immersed in a flow passage of the treatment-object water along with the conductor, wherein the controller executes a first processing step of, while circulating the treatment-object water, applying a positive potential to the conductor, and applying a negative potential to the electrode, thereby to cause the microorganisms to be adsorbed to the conductor; a second processing step of, after finishing the first processing step, stopping circulation of the treatment-object water, and increasing the potentials applied to the conductor and the electrode in the presence of the treatment-object water while maintaining polarities of the potentials applied to the conductor and the electrode, thereby to cause electrolysis of the treatment-object water; and a third processing step of, after finishing the second processing step, applying AC voltage across the electrode and the conductor in the presence of the treatment-object water.

Further, in the present invention, there is provided a water treating system further comprising an electrode immersed in a flow passage of the treatment-object water along with the conductor, wherein the controller executes a first processing step of, while circulating the treatment-object water, applying a positive potential to the conductor, and applying a negative potential to the electrode, thereby to cause the microorganisms to be adsorbed to the conductor; a second processing step of, after finishing the first processing step, stopping circulation of the treatment-object water, and increasing the potentials applied to the conductor and the electrode in the presence of the treatment-object water while inverting polarities of the potentials applied to the conductor and the electrode, thereby to cause electrolysis of the treatment-object water; and a third processing step of, after finishing the second processing step, applying AC voltage across the electrode and the conductor in the presence of the treatment-object water.

Further, in the present invention, there is provided a water treating system further comprising a heater for heating the treatment-object water, wherein the controller energizes the heater in the third processing step.

Further, in the present invention, there is provided a water treating system further comprising an electrode immersed in a flow passage of the treatment-object water along with the conductor, and a heater for heating the treatment-object water, wherein the controller executes a first processing step of, while circulating the treatment-object water, applying a positive potential to the conductor, and applying a negative potential to the electrode, thereby to cause the microorganisms to be adsorbed to the conductor; a second processing step of, after finishing the first processing step, stopping circulation of the treatment-object water, and increasing the potentials applied to the conductor and the electrode in the presence of the treatment-object water while maintaining polarities of the potentials applied to the conductor and the electrode, thereby to cause electrolysis of the treatment-object water; and a third processing step of, after finishing the second processing step, energizing the heater to heat the treatment-object water.

Further, in the present invention, there is provided a water treating system further comprising an electrode immersed in a flow passage of the treatment-object water along with the conductor, and a heater for heating the treatment-object water, wherein the controller executes a first processing step of, while circulating the treatment-object water, applying a positive potential to the conductor, and applying a negative potential to the electrode, thereby to cause the microorganisms to be adsorbed to the conductor; a second processing step of, after finishing the first processing step, stopping circulation of the treatment-object water, and increasing the potentials applied to the conductor and the electrode in the presence of the treatment-object water while inverting polarities of the potentials applied to the conductor and the electrode, thereby to cause electrolysis of the treatment-object water; and a third processing step of, after finishing the second processing step, energizing the heater to heat the treatment-object water.

Further, in the present invention, there is provided a water treating system wherein the application of the potentials to the electrode and the conductor is stopped in the third processing step.

Further, in the present invention, there is provided a water treating system wherein the electrode is provided on a treatment-object water flow-out side over the conductor, and the heater is provided on a treatment-object water flow-in side under the conductor, and wherein a bypass passage for the treatment-object water is provided that communicates with a lower side of the conductor and an upper side of the conductor, bypassing the conductor.

Further, in the present invention, there is provided a water treating system wherein a pump is provided in the bypass passage for conveying the treatment-object water from the lower side of the conductor to the upper side of the conductor, and the controller operates the pump in the third processing step.

Further, in the present invention, there is provided a water treating system wherein a lower surface of the conductor is inclined upward toward an inlet of the bypass passage.

Further, in the present invention, there is provided a water treating method or a water treating system further comprising a processing step of, after finishing the third processing step, discharging the treatment-object water in which the conductor and the electrode are immersed.

Further, in the present invention, there is provided a water treating method or a water treating system wherein the conductor is in the form of a porous body.

Further, in the present invention, there is provided a water treating method or a water treating system wherein the conductor is made of carbon fiber.

Further, in the present invention, there is provided a water treating method or a water treating system wherein the carbon fiber forming the conductor is added with noble metal such as palladium, platinum, iridium, tantalum or gold, or an oxide thereof, or a mixture thereof.

Further, in the present invention, there is provided a water treating method or a water treating system wherein, in the third processing step, chlorine and/or ozone is produced at one of the electrode and the conductor, and active oxygen is produced at the other thereof.

Further, in the present invention, there is provided a water treating method or a water treating system wherein the electrode is added with noble metal such as palladium, platinum, iridium, tantalum or gold, or an oxide thereof, or a mixture thereof.

Further, in the present invention, the negative potential charging rate of microorganisms generally charged at negative potential can be enhanced by adjusting pH of treatment-object water to be alkaline. By applying positive potential to a conductor, the microorganisms in the treatment-object water can be attracted to the conductor more strongly. As a result, the microorganisms in the treatment-object water can be efficiently adsorbed to the conductor, thereby to be collected and removed.

Further, in the present invention, by increasing the temperature of the treatment-object water, the movement of the microorganisms can be enhanced to improve the rate of adsorption to the conductor. As a result, the microorganisms in the treatment-object water can be efficiently adsorbed to the conductor, thereby to be collected and removed.

Further, in the present invention, the microorganisms whose negative potential charging rate is enhanced as noted above or whose movement is enhanced as noted above, can be strongly attracted to the conductor set to positive potential in the first processing step so as to be efficiently adsorbed and collected to the conductor. Then, in the next second processing step, circulation of the treatment-object water is stopped and the potentials applied to the conductor and the electrode are increased while maintaining the polarities of the potentials applied to the conductor and the electrode as they are, thereby to conduct electrolysis of the treatment-object water. Accordingly, pH of the treatment-object water near the surface of the conductor is lowered to an acidic state, so that pH of the treatment-object water around the microorganisms can be largely deviated from optimum pH of the microorganisms. Further, hypochlorous acid is simultaneously produced on the surface of the conductor. Since the microorganisms are metabolized by enzyme, the microorganisms cause metabolic abnormality in the treatment-object water whose pH is deviated from optimum pH, so that proliferation and heat-resistant properties thereof are largely lowered. This makes it possible to annihilate the microorganisms with a smaller temperature increase. Further, sterilization based on hypochlorous acid is carried out to some extent in the second processing step.

Then, AC voltage is applied across the electrode and the conductor in the third processing step, so that the treatment-object water generates heat. With the temperature increase caused by the heat generation, the microorganisms adsorbed to the conductor and causing the metabolic abnormality due to the treatment-object water being deviated from optimum pH, die out. In this manner, by largely deviating pH of the treatment-object water such as waste water from optimum pH of the microorganisms, the microorganisms can be efficiently adsorbed and exterminated with a smaller temperature increase, thereby to significantly improve the effect of removal of the microorganisms in the treatment-object water.

Further, in the present invention, the microorganisms whose negative potential charging rate is enhanced as noted above or whose movement is enhanced as noted above, can be strongly attracted to the conductor set to positive potential in the first processing step so as to be efficiently adsorbed and collected to the conductor. Then, in the next second processing step, circulation of the treatment-object water is stopped and the potentials applied to the conductor and the electrode are increased while inverting the polarities of the potentials applied to the conductor and the electrode, thereby to conduct electrolysis of the treatment-object water. Accordingly, pH of the treatment-object water near the surface of the conductor is increased to an alkaline state, so that pH of the treatment-object water around the microorganisms can be largely deviated from optimum pH of the microorganisms. Since the microorganisms are metabolized by enzyme, the microorganisms cause metabolic abnormality in the treatment-object water whose pH is deviated from optimum pH, so that proliferation and heat-resistant properties thereof are largely lowered. This makes it possible to annihilate the microorganisms with a smaller temperature increase.

Then, AC voltage is applied across the electrode and the conductor in the third processing step, so that the treatment-object water generates heat. With the temperature increase caused by the heat generation, the microorganisms adsorbed to the conductor and causing the metabolic abnormality due to the treatment-object water being deviated from optimum pH, die out. In this manner, the microorganisms contained in the treatment-object water such as waste water can be efficiently adsorbed and exterminated, thereby to significantly improve the effect of removal of the microorganisms in the treatment-object water.

Further, in the present invention, in the foregoing third processing step, since the treatment-object water is heated by a heater, the treatment-object water quickly increases in temperature due to the heat from the heater, in addition to the heat generation caused by AC voltage applied across the electrode and the conductor. As a result, the microorganisms strongly adsorbed to the conductor can be annihilated more quickly and effectively.

Further, in the present invention, the microorganisms whose negative potential charging rate is enhanced as noted above or whose movement is enhanced as noted above, can be strongly attracted to the conductor set to positive potential in the first processing step so as to be efficiently adsorbed and collected to the conductor. Then, in the next second processing step, circulation of the treatment-object water is stopped and the potentials applied to the conductor and the electrode are increased while maintaining the polarities of the potentials applied to the conductor and the electrode as they are, thereby to conduct electrolysis of the treatment-object water. Accordingly, pH of the treatment-object water near the surface of the conductor is lowered to an acidic state, so that pH of the treatment-object water around the microorganisms can be largely deviated from optimum pH of the microorganisms. Further, hypochlorous acid is simultaneously produced on the surface of the conductor. Since the microorganisms are metabolized by enzyme, the microorganisms cause metabolic abnormality in the treatment-object water whose pH is deviated from optimum pH, so that proliferation and heat-resistant properties thereof are largely lowered. This makes it possible to annihilate the microorganisms with a smaller temperature increase. Further, sterilization based on hypochlorous acid is carried out to some extent in the second processing step.

Then, the treatment-object water is heated by the heater in the third processing step. With the temperature increase of the treatment-object water caused by this heating, the microorganisms adsorbed to the conductor and causing the metabolic abnormality due to the treatment-object water being deviated from optimum pH, die out. In this manner, by largely deviating pH of the treatment-object water such as waste water from optimum pH of the microorganisms, the microorganisms can be efficiently adsorbed and exterminated with a smaller temperature increase, thereby to significantly improve the effect of removal of the microorganisms in the treatment-object water.

Further, in the present invention, the microorganisms whose negative potential charging rate is enhanced as noted above or whose movement is enhanced as noted above, can be strongly attracted to the conductor set to positive potential in the first processing step so as to be efficiently adsorbed and collected to the conductor. Then, in the next second processing step, circulation of the treatment-object water is stopped and the potentials applied to the conductor and the electrode are increased while inverting the polarities of the potentials applied to the conductor and the electrode, thereby to conduct electrolysis of the treatment-object water. Accordingly, pH of the treatment-object water near the surface of the conductor is increased to an alkaline state, so that pH of the treatment-object water around the microorganisms can be largely deviated from optimum pH of the microorganisms. Since the microorganisms are metabolized by enzyme, the microorganisms cause metabolic abnormality in the treatment-object water whose pH is deviated from optimum pH, so that proliferation and heat-resistant properties thereof are largely lowered. This makes it possible to annihilate the microorganisms with a smaller temperature increase.

Then, the treatment-object water is heated by the heater in the third processing step. With the temperature increase of the treatment-object water caused by this heating, the microorganisms adsorbed to the conductor and causing the metabolic abnormality due to the treatment-object water being deviated from optimum pH, die out. In this manner, the microorganisms contained in the treatment-object water such as waste water can be efficiently adsorbed and exterminated, thereby to significantly improve the effect of removal of the microorganisms in the treatment-object water.

Further, in the present invention, application of the potentials to the electrode and the conductor is stopped in the foregoing third processing step, so that it is possible to reduce as much as possible the power consumption that increases following the energization of the heater.

Further, in the present invention, the electrode is provided on the treatment-object water flow-out side over the conductor, and the heater is provided on the treatment-object water flow-in side under the conductor. Therefore, heating of the treatment-object water by the heater can be carried out smoothly. Further, a bypass passage for the treatment-object water is provided that communicates with the lower side of the conductor and the upper side of the conductor, bypassing the conductor. Thus, the bubbles generated under the conductor due to the heat generation of the heater can be conveyed to the upper side of the conductor via the bypass passage so as to be discharged. Accordingly, it is possible to avoid the inconvenience wherein the bubbles stay under the conductor to impede the treatment of the treatment-object water.

Further, in the present invention, in addition to the foregoing, a pump is provided in the bypass passage for conveying the treatment-object water from the lower side of the conductor to the upper side of the conductor, and the controller operates the pump in the third processing step. Therefore, the bubbles generated under the conductor upon heat generation of the heater can be smoothly conveyed to the upper side of the conductor so as to be discharged.

Further, in the present invention, the lower surface of the conductor is inclined upward toward an inlet of the bypass passage. Therefore, the bubbles generated under the conductor can easily enter the bypass passage, so that the treatment of the bubbles can be performed more smoothly.

Further, in the present invention, the microorganisms collected to the conductor to be exterminated can be washed out after finishing the third processing step. In this event, since the treatment-object water in which the conductor and the electrode are immersed is discharged, the microorganisms adsorbed to the conductor and the electrode can be easily peeled off by the running water. Thus, the conductor and the electrode can be maintained clean.

Further, in the present invention, in addition to the foregoing respective inventions, the conductor is in the form of a porous body, so that the effect of collecting the microorganisms can be significantly improved. Further, in the present invention, the conductor is made of carbon fiber, so that the effect of collecting the microorganisms in the first processing step, and the effect of deviating pH of the treatment-object water from optimum pH due to the electrolysis in the second processing step can be improved.

Further, in the present invention, in addition to the foregoing, the carbon fiber forming the conductor is added with noble metal such as palladium, platinum, iridium, tantalum or gold, or an oxide thereof, or a mixture thereof. Therefore, deterioration of the conductor in the form of the carbon fiber can be suppressed to prolong the life thereof, and further, hypochlorous acid can be efficiently produced.

Further, in the present invention, in the third processing step, chlorine and/or ozone is produced at one of the electrode and the conductor, and active oxygen is produced at the other thereof. Therefore, the microorganisms can be annihilated even by chlorine and/or ozone produced due to electrolysis at one of the electrode and the conductor charged at positive potential in the third processing step, and active oxygen produced due to electrolysis at the other thereof charged at negative potential.

Further, in the present invention, the electrode is added with noble metal such as palladium, platinum, iridium, tantalum or gold, or an oxide thereof, or a mixture thereof. Therefore, the efficiency of producing chlorine and/or ozone, or active oxygen at the electrode can be further improved.

DESCRIPTION OF THE PREFERRED EMBODIMENT

Figure 1:
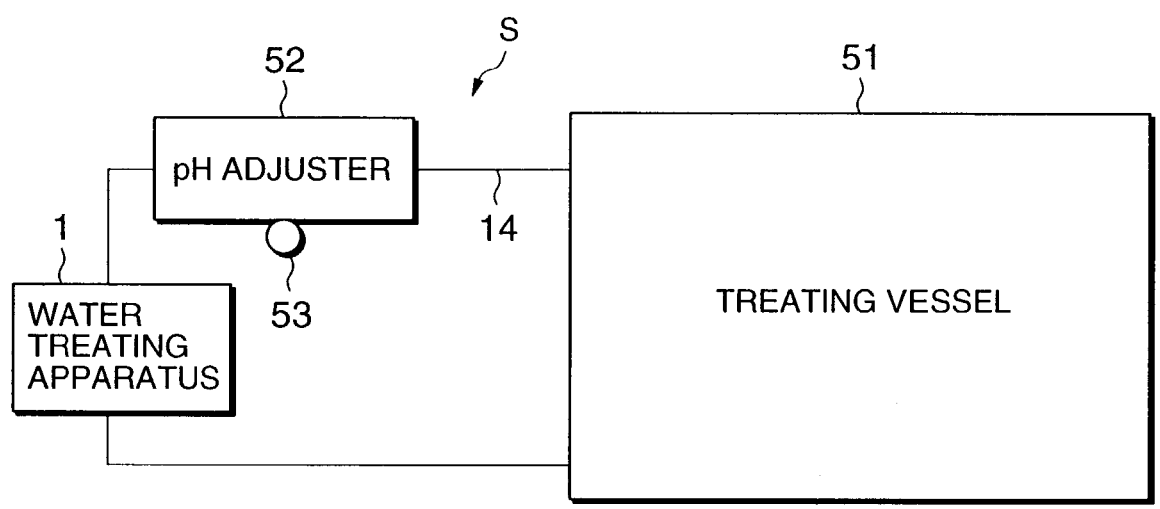
FIG. 1 is a block diagram showing a water treating system according to an embodiment of the present invention.
Figure 2:
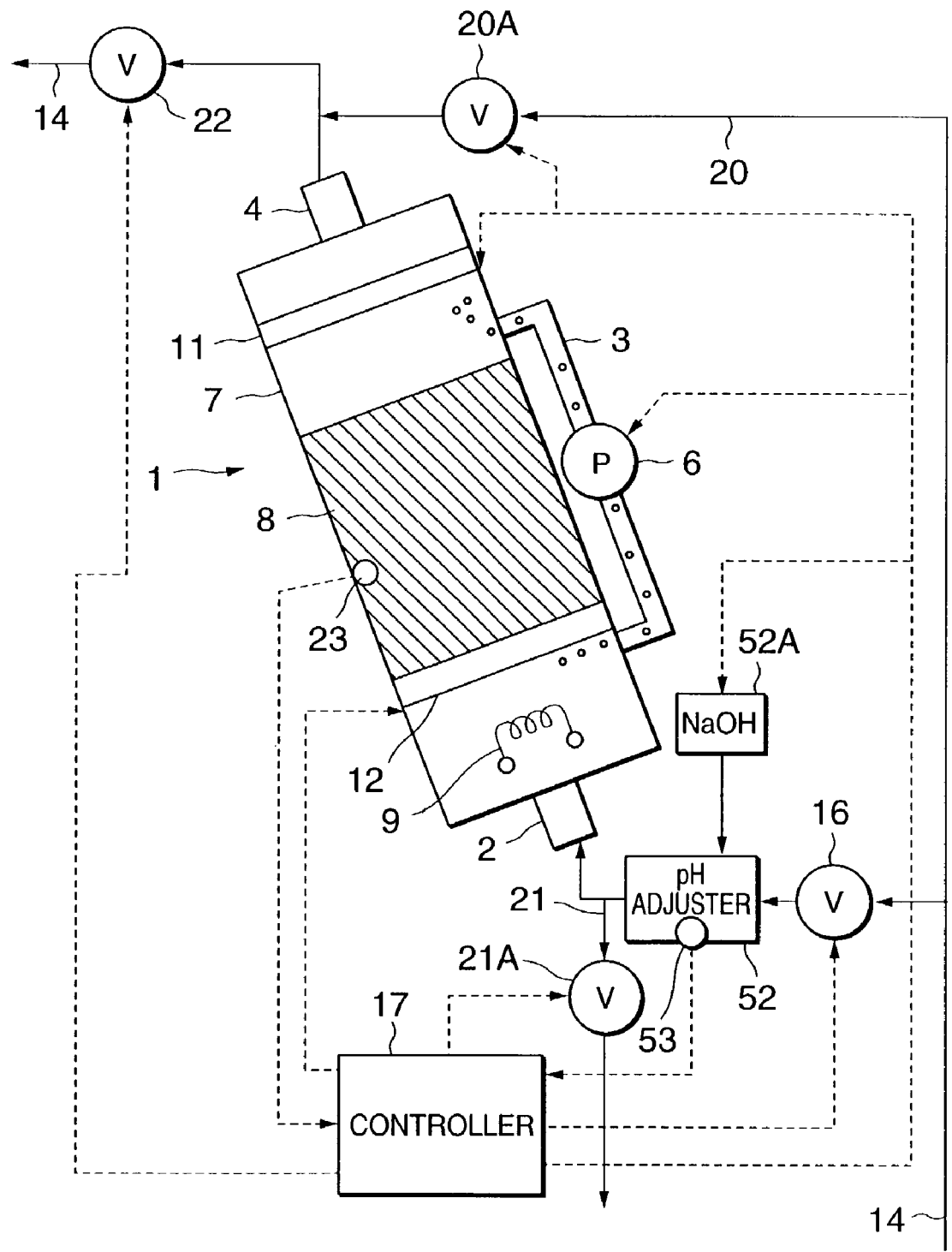
FIG. 2 is a detailed block diagram showing an arrangement around a water treating apparatus constituting the water treating system of FIG. 1.

Now, preferred embodiments of the present invention will be described in detail with reference to the accompanying drawings. FIG. 1 is a block diagram showing a water treating system S according to an embodiment applied with the present invention, and FIG. 2 is a detailed block diagram showing an arrangement around a water treating apparatus 1 constituting the water treating system S. In the water treating system S of FIG. 1, numeral 51 denotes a treating vessel for storing and treating treatment-object water such as waste water discharged from fish farms, food and drink manufacturing facilities, or the like, and numeral 14 denotes a circulation system (pipe) through which the treatment-object water in the treating vessel 51 is circulated. A pH adjuster 52 and the foregoing water treating apparatus 1 are arranged in the circulation system 14, thereby to constitute the water treating system S of the present invention.

In FIG. 2, the water treating apparatus 1 comprises a casing 7 of, for example, a cylindrical shape, provided at its lower end with an inlet 2 for introducing the treatment-object water from the treating vessel 51, and at its upper end with an outlet 4 for the treatment-object water, a water-permeable carbon fiber 8 as a conductive material disposed in the casing 7 at an approximately center portion in a vertical direction with no gap between itself and the inner circumference of the casing 7, an netlike electrode 11 provided in the casing 7 spaced apart upward from the carbon fiber 8, and a netlike electrode 12 provided in the casing 7 abutting the lower surface of the carbon fiber 8 so as to allow electric conduction between itself and the carbon fiber 8. The electrodes 11 and 12 each may be made of a carbon fiber. In this event, a portion of the carbon fiber 8 forms the electrode 12, so that the carbon fiber 8 serves as a carbon fiber electrode.

The casing 7 is arranged so as to be inclined by approximately 30 degrees from the upright state. To the outer periphery of the casing 7, a bypass passage 3 is attached to establish communication between an upper side and a lower side, in the casing 7, of the carbon fiber 8, bypassing the carbon fiber 8. By inclining the casing 7 as described above, the lower surface of the carbon fiber 8 is inclined upward toward an inlet of the bypass passage 3. Further, a pump 6 is provided in the bypass passage 3, so that, when operated, the pump 6 conveys the treatment-object water from the lower side of the carbon fiber 8 to the upper side thereof.

An electric heater 9 in the form of a sheathed heater is further provided in the casing 7 between the inlet 2 and the electrode 12, so that, when energized, the heater 9 generates heat to heat the treatment-object water in the casing 7.

The inlet 2 and the outlet 4 of the water treating apparatus 1 are connected to the circulation system 14 from the treating vessel 51. A valve 16 is provided in the circulation system 14 upstream of the inlet 2. A water flow valve 22 is provided in the circulation system 14 downstream of the outlet 14, and a bypass pipe 20 bypassing the water treating apparatus 1 is connected to the circulation system 14. The bypass pipe 20 is connected to a portion of the circulation system 14 upstream of the valve 16 and to a portion thereof between the outlet 4 and the water flow valve 22. In the bypass pipe 20, a bypass valve 20A is provided.

The pH adjuster 52 is connected to the circulation system 14 between the valve 16 and the inlet 2. The pH adjuster 52 is provided with a pH sensor 53 connected to a later-described controller 17. Further, a feeder 52A is connected to the pH adjuster 52 for automatically feeding, for example, sodium hydroxide (NaOH). The feeder 52A is controlled by the controller 17 to introduce sodium hydroxide into the treatment-object water flowing in the pH adjuster 52. The pH sensor 53 detects pH of the treatment-object water flowing through the pH adjuster 52 and outputs the detection result to the controller 17. Base on pH of the treatment-object water detected by the pH sensor 53, a feed amount of sodium hydroxide from the feeder 52A is controlled by the controller 17.

Further, a discharge pipe 21 provided therein with a discharge valve 21A is connected to the circulation system 14 between the inlet 2 and the pH adjuster 52. A downstream end of the discharge pipe 21 communicates with a drain ditch (not shown) or the treating vessel 51. The controller 17 controls application of potential to the electrodes 11 and 12, energization of the electric heater 9, operation of the pump 6, and open-close operations of the valve 16, the bypass valve 20A, the discharge valve 21A and the water flow valve 22. Numeral 23 denotes a temperature sensor for detecting a temperature of the carbon fiber 8 (or the treatment-object water in the casing 7). The temperature sensor 23 is connected to the controller 17.

The carbon fiber 8 is a porous conductor and serves as a filter for the treatment-object water flowing in the water treating apparatus 1. The carbon fiber 8 and the electrodes 11 and 12 (the electrode 12 is electrically connected to the carbon fiber 8 and confronts the electrode 11 via the carbon fiber 8 interposed therebetween in the casing 7) are each added, at least on the surface thereof, with noble metal such as palladium (Pd), platinum (Pt), iridium (Ir), tantalum (Ta) or gold (Au), or an oxide thereof, or a mixture thereof.

With the foregoing structure, explanation will now be made of an operation of treating the treatment-object water in the treating vessel 51 by the controller 17. The controller 17 is in the form of, for example, a general purpose microcomputer, and executes the following first to fourth processing steps in sequence according to a preset program.

(1) First Processing Step

The controller 17 first closes the bypass valve 20A and the discharge valve 21A while opens the valve 16 and the water flow valve 22. Accordingly, the treatment-object water flows into the casing 7 of the water treating apparatus 1 via the inlet 2, then passes through the electrode 12 to reach the carbon fiber 8, further passes through the inside of the casing 7 to reach the electrode 11, and then flows out via the outlet 4. As a result, the effect is that the electrodes 11 and 12 and the carbon fiber 8 are immersed in the treatment-object water. In the course of passing through the carbon fiber 8, microorganisms such as bacteria or molds contained in the treatment-object water are captured in fine holes formed on the surface of the carbon fiber 8, or due to affinity between the carbon fiber 8 and the microorganisms, or due to the filter action of the carbon fiber 8, so as to be adsorbed to the carbon fiber 8.

The controller 17 controls the feeder 52A based on an output from the pH sensor 53 to add sodium hydroxide (NaOH) into the treatment-object water flowing through the pH adjuster 52, thereby to adjust pH of the treatment-object water flowing into the water treating apparatus 1 in a range of, for example, pH 10 to pH 11, representing strong alkalinity. Specifically, when pH of the treatment-object water flowing in the circulation system 14 is lower than such a range, the controller 17 controls the feeder 52A to feed sodium hydroxide, while stop feeding when pH thereof enters such a range.

Figure 3:
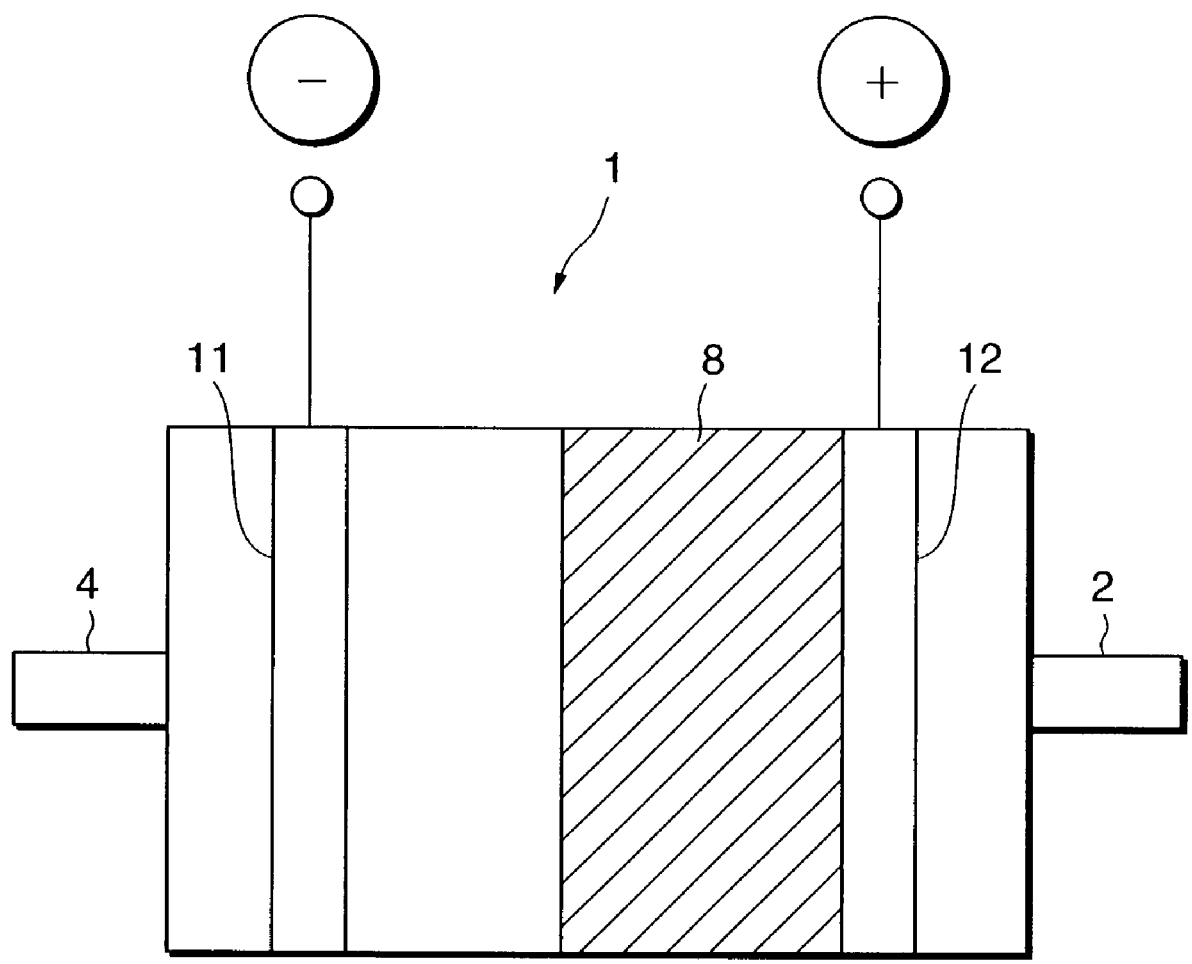
FIG. 3 is a diagram for explaining the state of applying potentials to a carbon fiber and respective electrodes in the first and second processing steps in the water treating apparatus of FIG. 2.

On the other hand, as shown in FIG. 3, the controller 17 applies positive potential (+) to the electrode 12 electrically connected to the carbon fiber 8. Thus, the potential of the carbon fiber 8 becomes positive. On the other hand, the computer 17 applies negative potential (−) to the electrode 11. In this event, the applied potentials are to the extent that does not cause electrolysis of water, and determined according to the quality of the treatment-object water or the like. It is assumed that the casing 7 is filled with the treatment-object water in FIG. 3.

Microorganisms are generally charged at negative potential as described before and, by adjusting the treatment-object water to the strong alkalinity as noted above, the negative potential charging rate of microorganisms in the treatment-object water is enhanced. Accordingly, the microorganisms are strongly attracted to the carbon fiber 8 set to the positive potential. As a result, the microorganisms entering the carbon fiber 8 are strongly attracted to the surface of the carbon fiber 8 so as to be quickly and efficiently adsorbed to the inside of the fine holes thereof.

By executing the foregoing first processing step, the treatment-object water passing through the inside of the water treating apparatus 1 and flowing out from the outlet 4 becomes such waste water wherein the microorganisms are removed because of adsorption to the carbon fiber 8. In this manner, microorganisms in the treatment-object water within the treating vessel 51 are quickly removed. The controller 17 executes this first processing step for a predetermined term. After executing the first processing step for the predetermined term, the controller 17 executes the second processing step.

(2) Second Processing Step

In the second processing step, the controller 17 closes the valve 16 and the water flow valve 22. This causes the treatment-object water to stay within the casing 7 of the water treating apparatus 1. The controller 17 further stops feeding of sodium hydroxide by the feeder 52A. In this state, the controller 17 increases the potentials applied to the electrodes 11 and 12 while maintaining the polarities thereof as they are, thereby to cause electrolysis of the treatment-object water. Also in this event, the applied potentials are determined based on the quality of the treatment-object water or the like. It is assumed also in this event that the casing 7 is filled with the treatment-object water in FIG. 3.

Since the carbon fiber 8 is set to the positive potential in the state where the treatment-object water stays within the casing 7 of the water treating apparatus 1, pH of the treatment-object water near the surface of the carbon fiber 8 is lowered to an acidic state of, for example, about pH 2. It is reported that optimum pH of microorganisms is generally around pH 7. Thus, in the treatment-object water whose pH is deviated from optimum pH, the microorganisms cause metabolic abnormality so that proliferation and heat-resistant properties thereof are largely lowered. Further, since the treatment-object water around the microorganisms adsorbed to the carbon fiber 8 becomes acid as noted above, the heat-resistant property of the microorganisms that can normally withstand up to about +60° C. is extremely lowered. In this manner, electrolysis of the treatment-object water is caused to largely deviate pH of the treatment-object water from optimum pH of the microorganisms. Further, since generation of hypochlorous acid also takes place in the second processing step, sterilization based on this hypochlorous acid is also carried out to some extent.

Figure 4:
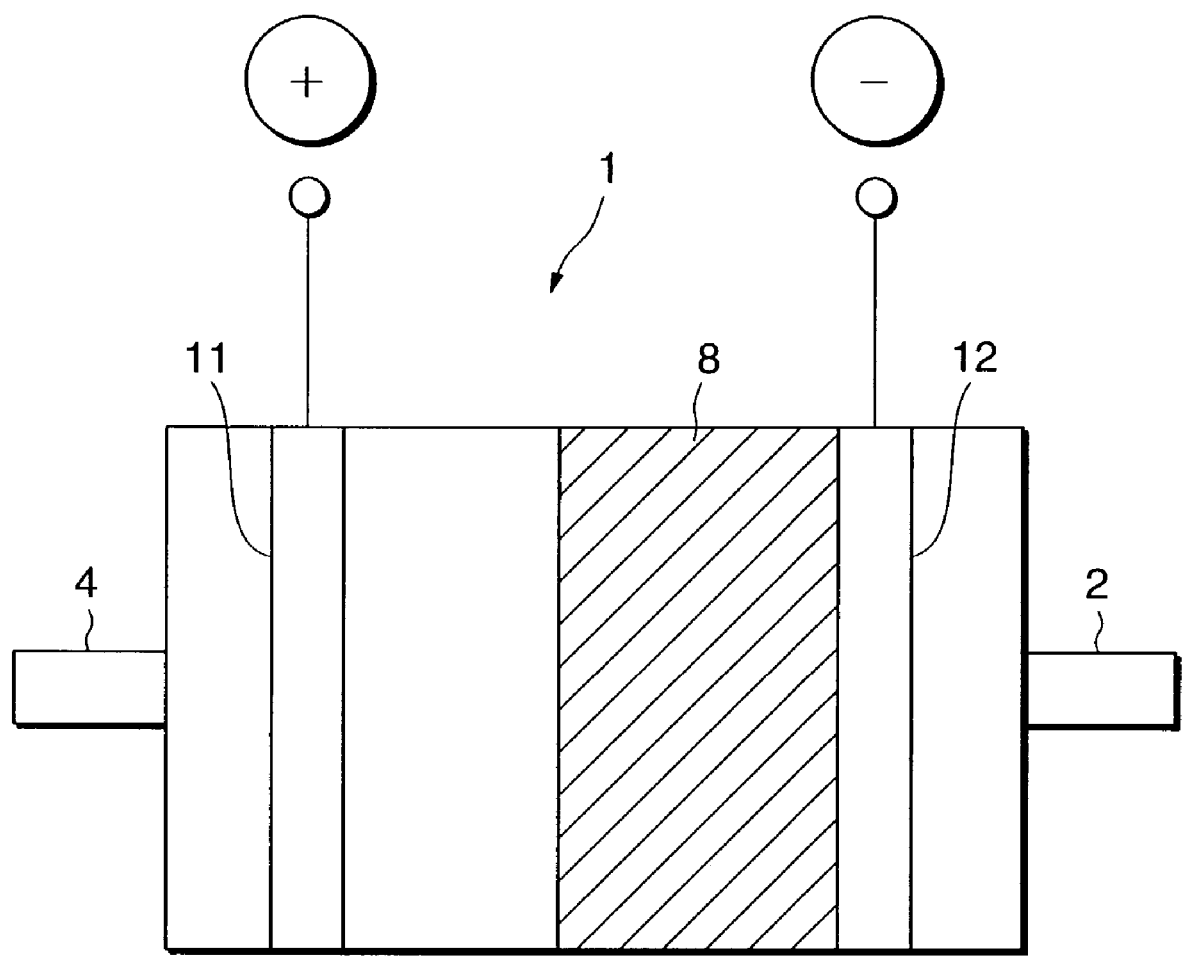
FIG. 4 is a diagram for explaining the state of applying potentials to the carbon fiber and the respective electrodes in another second processing step in the water treating apparatus of FIG. 2.

On the other hand, there are those microorganisms that are liable to be charged at positive potential. When treating the treatment-object water for coping with such microorganisms, hydrochloric acid (HCl), for example, is fed to the pH adjuster 52 from the feeder 52A, thereby to adjust pH of the treatment-object water flowing into the water treating apparatus 1 to strong acidity of, for example, pH 3 to pH 4. This increases the positive potential charging rate of the microorganisms as described before. Further, in the foregoing first processing step, the carbon fiber 8 is set to negative potential while the electrode 11 is set to positive potential as shown in FIG. 4, which is contrary to the foregoing. As a result, the microorganisms are strongly attracted to the carbon fiber 8 and adsorbed thereto.

On the other hand, in case of microorganisms like protozoa, the treating efficiency is improved by denaturing and dissolving protein. Therefore, in case of treatment-object water containing a lot of such microorganisms, after finishing the foregoing first processing step, the potential of the carbon fiber 8 (potential of electrode 12) and the potential of the electrode 11 are inverted to execute another second processing step.

(3) Another Second Processing Step

In this second processing step, the controller 17 applies negative potential (−) to the electrode 12 electrically connected to the carbon fiber 8 as shown in FIG. 4. Thus, the potential of the carbon fiber 8 becomes negative. On the other hand, the controller 17 applies positive potential (+) to the electrode 11. Also in this event, the applied potentials are determined based on the quality of the treatment-object water or the like. It is assumed also in this event that the casing 7 is filled with the treatment-object water in FIG. 4.

Since the carbon fiber 8 is set to the negative potential, pH of the treatment-object water near the surface of the carbon fiber 8 increases to an alkaline state of, for example, about pH 12. Thus, since the treatment-object water around the microorganisms adsorbed to the carbon fiber 8 becomes alkaline, protein of the microorganisms such as protozoa is denatured and dissolved, so that resistance thereof is lowered. As a result, the sterilizing effect in the third processing step executed subsequently to the second processing step is improved. Then, the controller 17 performs electrolysis of the treatment-object water in this second processing step for a predetermined time, and then executes the third processing step.

(4) Third Processing Step

Figure 9:
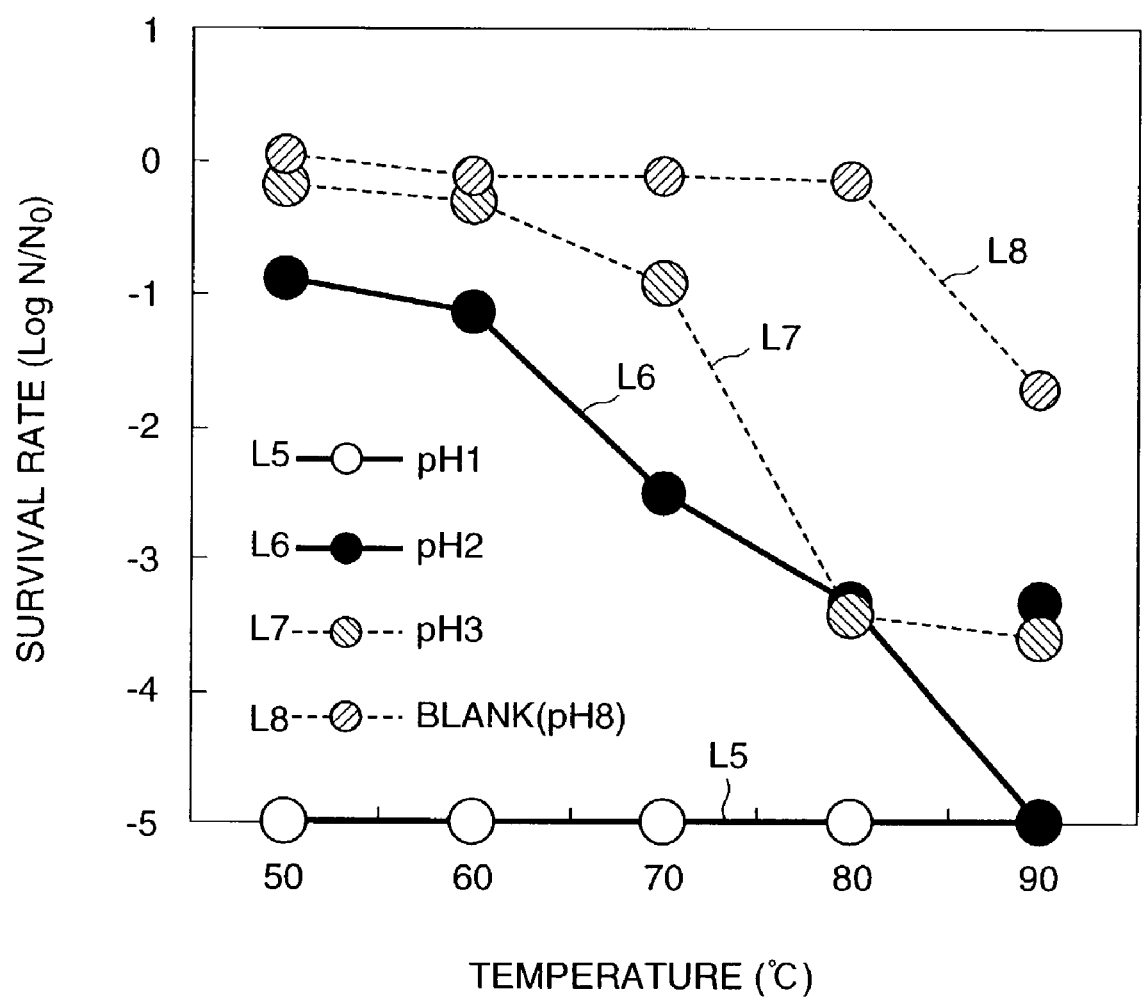
FIG. 9 is a diagram showing an effect of sterilizing spore bacteria based on pH and heating.
Figure 10:
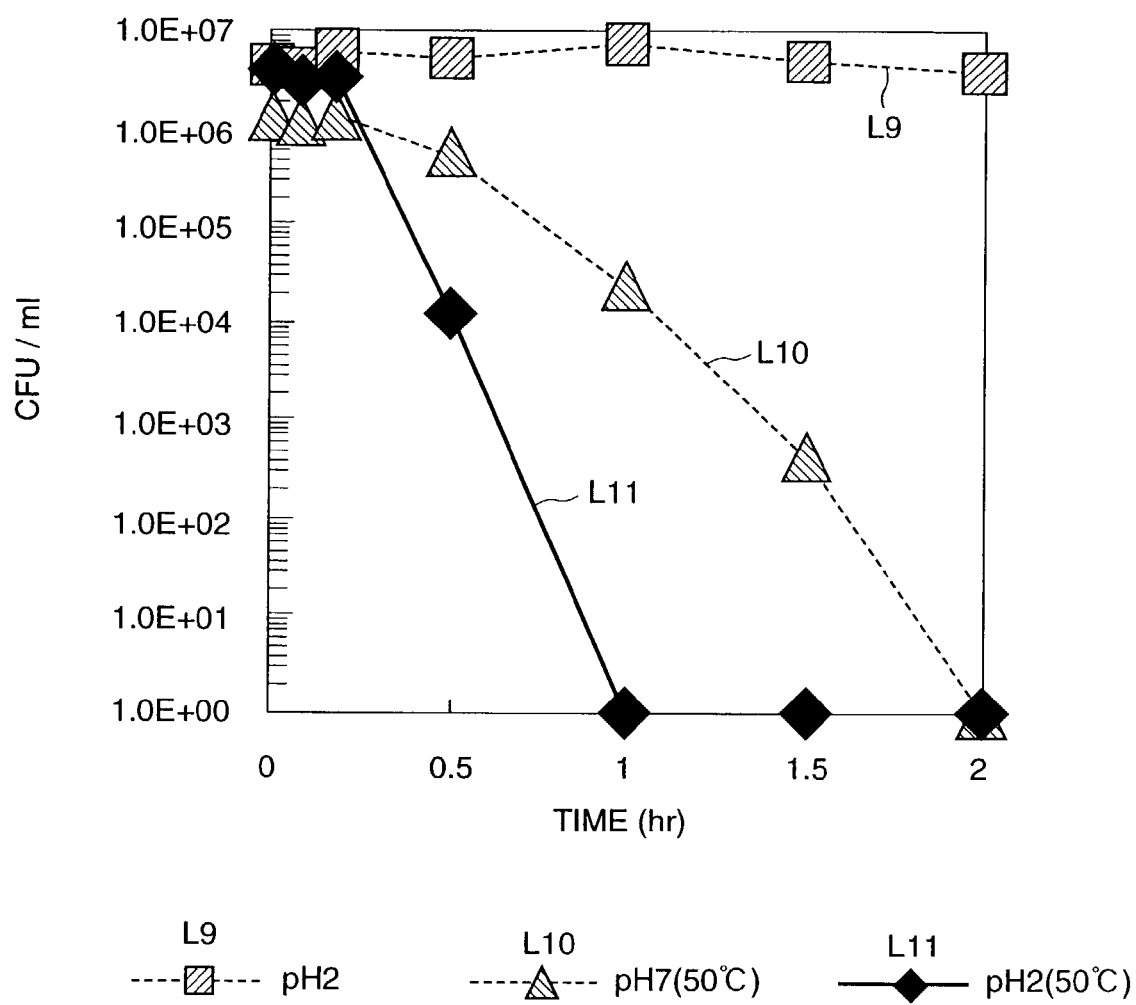
FIG. 10 is a diagram showing an effect of sterilizing yeasts based on pH and heating.

In the third processing step, the controller 17 applies AC voltage between the electrode 11 and the electrode 12 (carbon fiber 8). Accordingly, current flows through the treatment-object water between the electrode 11 and the electrode 12, and the carbon fiber 8, so that the carbon fiber 8 and the treatment-object water generate heat. In this event, the temperatures of the carbon fiber 8 and the treatment-object water increase up to at least about +50° C. to about +70° C. (range of +50° C. to +100° C.). Due to the temperature increase caused by the heat generation, the microorganisms having been adsorbed to the carbon fiber 8 in the first processing step and having survived the second processing step with the lowered resistance are efficiently exterminated in the third processing step. Since the treatment-object water was electrolyzed in the second processing step to reduce or increase pH thereof, even such microorganisms that can normally withstand up to about +80° C. can be annihilated at a lower temperature of about +50° C. to about +70° C. FIG. 9 shows the survival rate of spore bacteria when subjected to sterilization based on pH and heating. The axis of abscissas represents temperature, a treating time is 30 minutes, L5 shows results in case of pH 1, L6 in case of pH 2, L7 in case of pH3, and L8 in case of pH 8. As clear from FIG. 9, it is seen that even spore bacteria that can survive up to +80° C. or more in an environment of pH 8, die out at about +50° C. to about 60° C. in an environment of pH 2 to 3. FIG. 10 shows the survival rate of yeasts when subjected to sterilization based on pH and heating. The axis of abscissas represents time, L9 shows results in case of pH 2 and ordinary temperature, L10 in case of pH 7 and +50° C., and L11 in case of pH 2 and +50° C. As clear from FIG. 10, it is seen that even yeasts that can survive in an environment of pH 2 quickly die out in an environment of +50° C.

Further, electrolysis of the treatment-object water takes place at the electrode 11 and the electrode 12 (carbon fiber 8). At the electrode 12 (carbon fiber 8) set to positive potential to serve as the anode, chlorine ions in the treatment-object water emit electrons so that chlorine (or hypochlorous acid) is produced. Further, water molecules are decomposed, and oxygen atoms are coupled together to produce ozone (reference literature: "Production of Ozone based on Aqueous Solution Electrolysis", Soda and Chlorine, No. 5, 1986). On the other hand, at the electrode 11 set to negative potential to serve as the cathode, active oxygen (hydrogen peroxide or the like) is produced (reference literature: Surface (Hyomen Danwakai, Colloid Konwakai), vol. 34, No. 10, 1996).

Production of chlorine, hypochlorous acid (HClO) at the foregoing anode and reaction formulae representing an alkaline state are shown by the following [2] to [4].

[2] 

[3] 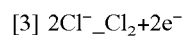

[4] 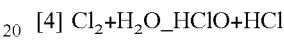

When AC voltage is applied across the electrode 12 (carbon fiber 8) and the electrode 11, it is possible to heat the treatment-object water in the casing 7 without causing polarization on the electrodes. With the temperature increase of the treatment-object water in the casing 7, the microorganisms whose heat-resistant property is lowered due to the electrolysis can be annihilated further efficiently.

On the other hand, when heating the treatment-object water by applying DC voltage across the electrode 12 and the electrode 11, water electrolysis takes place in addition to the foregoing generation of ozone or the like in case of the direct current, so that the energy is consumed for other than the generation of heat. On the other hand, water electrolysis does not occur in case of the alternating current, so that the microorganisms can be annihilated with less power consumption. Thus, energy saving can be achieved significantly, which is economically advantageous. Further, since the alternating current causes no chemical change, it is also expected that the electrode life can be prolonged.

Since the respective electrodes 11 and 12 and the carbon fiber 8 are each added with noble metal such as palladium, platinum, iridium, tantalum or gold, or an oxide thereof, or a mixture thereof, chlorine and/or ozone is actively produced on the side to be the anode, and active oxygen is actively produced on the side to be the cathode. The microorganisms on the surface of the carbon fiber 8 and in the treatment-object water are annihilated also by these chlorine (hypochlorous acid), ozone and active oxygen.

(5) Another Third Processing Step

Instead of applying AC voltage to the electrodes 11 and 12 (Third Processing Step (4)), the treatment-object water and the carbon fiber 8 may be heated by the electric heater 9. In this event, the controller 17 energizes (AC voltage) the electric heater 9 to generate heat, thereby to heat the carbon fiber 8 and the treatment-object water.

Also in this event, the temperatures of the carbon fiber 8 and the treatment-object water are increased up to at least about +50° C. (range of +50° C. to +100° C.). Due to the temperature increase caused by the heat generation, the microorganisms having been strongly attracted to be adsorbed to the carbon fiber 8 in the first processing step and survived the second processing step with the lowered heat resistance are efficiently annihilated in this another third processing step. Since the treatment-object water was electrolyzed in the second processing step to reduce or increase pH thereof, even such microorganisms that can normally withstand up to about +60° C. can be annihilated at a lower temperature of about +50° C.

In this event, bubbles are produced in the casing 7 under the carbon fiber 8 (electrode 12) due to the heat generation of the electric heater 9. Since the bubbles are reluctant to pass through the carbon fiber 8, the bubbles may stay in the casing 7 under the carbon fiber 8 (electrode 12) to impede the treatment of the treatment-object water. In view of this, while energizing the electric heater 9, the controller 17 operates the pump 6 to convey the bubbles with a litter treatment-object water from the lower side of the carbon fiber 8 to the upper side thereof (shown in FIG. 2). The conveyed bubbles are then discharged via the outlet 4.

In this manner, the inconvenience that the bubbles produced by the heat generation of the electric heater 9 stay in the casing 7 can be overcome. The energization of the electric heater 9 is controlled by the controller 17 based on an output from the temperature sensor 23. The pump 6 may be operated continuously or intermittently during the energization of the electric heater 9. Further, the pump 6 may be operated continuously or intermittently during this another third processing step, regardless of the energization of the electric heater 9. Moreover, the pump 6 may be controlled based on the temperature increase of the treatment-object water (carbon fiber 8) detected by the temperature sensor 23.

Further, in this another third processing step, in addition to the heat generation of the electric heater 9, AC voltage may be applied across the electrode 11 and the electrode 12 (carbon fiber 8) to heat the treatment-object water and the carbon fiber 8 like in Third Processing Step (4). According to this arrangement, the temperature increase of the treatment-object water (carbon fiber 8) in the third processing step can be achieved quickly to improve the effect of treating the microorganisms.

Then, after annihilating the microorganisms in the third processing step, the controller 17 executes the fourth processing step.

(6) Fourth Processing Step

In the fourth processing step, after finishing the third processing step, the controller 17 opens the bypass valve 20A and the discharge valve 21A while closing the valve 16 and the water flow valve 22. Through this operation, the treatment-object water from the circulation system 14 flows into the casing 7 via the outlet 4, flows through the inside of the casing 7, flows out via the inlet 2, and then discharged into the drain ditch via the discharge pipe 21 or returns to the treating vessel 51.

In this event, negative potential is applied to the electrode 12 to cause the carbon fiber 8 to be at the negative potential, thereby to repel the microorganisms charged at negative potential for peeling them off or facilitating peeling them off. With this arrangement, the microorganisms adsorbed to the carbon fiber 8 in a direction from the inlet 2 are easily peeled off from the carbon fiber 8 by means of the treatment-object water flowing in a direction from the outlet 4 and passing in the direction toward the inlet 2, and then discharged into the drain ditch via the discharge pipe 21. As a result, the carbon fiber 8 can be restored to the initial clean state where the microorganisms are not adsorbed, so that the carbon fiber 8 and the respective electrodes 11 and 12 can be maintained clean.

In this manner, in the second and third processing steps, the microorganisms adsorbed to the carbon fiber 8 are annihilated and, in the fourth step, the treatment-object water is allowed to enter via the outlet 4 of the water treating apparatus 1 and discharged via the discharge pipe 21 connected between the inlet 2 and the valve 16. With this arrangement, the dead microorganisms adsorbed to the carbon fiber 8 can be peeled off and washed out, and then discharged into the drain ditch. Accordingly, it is possible to reproduce the excellent microorganism adsorbing action by the carbon fiber 8 when the next first processing step is executed.

Figure 5:
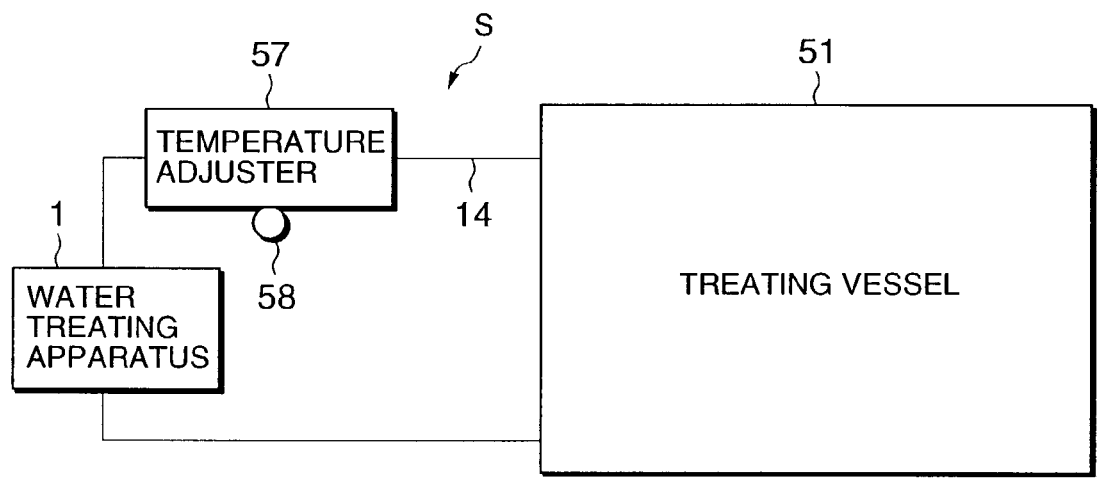
FIG. 5 is a block diagram showing a water treating system according to another embodiment of the present invention.

In the foregoing embodiment, the pH adjuster 52 and the feeder 52A are provided to adjust pH of the treatment-object water flowing into the water treating apparatus 1. However, instead of the pH adjuster 52, a temperature adjuster 57 may be provided in the circulation system 14 as shown in FIG. 5. Numeral 58 denotes a temperature sensor for detecting the temperature of the treatment-object water flowing in the temperature adjuster 57. The temperature sensor 58 is connected to the controller 17.

The temperature adjuster 57 comprises an electric heater whose energization is controlled by the controller 17, and heats the treatment-object water flowing into the water treating apparatus 1 to increase the temperature of the treatment-object water to a predetermined temperature (e.g. +25° C. to +35° C.) higher than normal water temperature. When the temperature of the treatment-object water increases, the microorganisms become easily movable, so that the efficiency of adsorption to the carbon fiber 8 in the foregoing first processing step is improved, and thus the effect similar to the foregoing can be expected.

Figure 6:
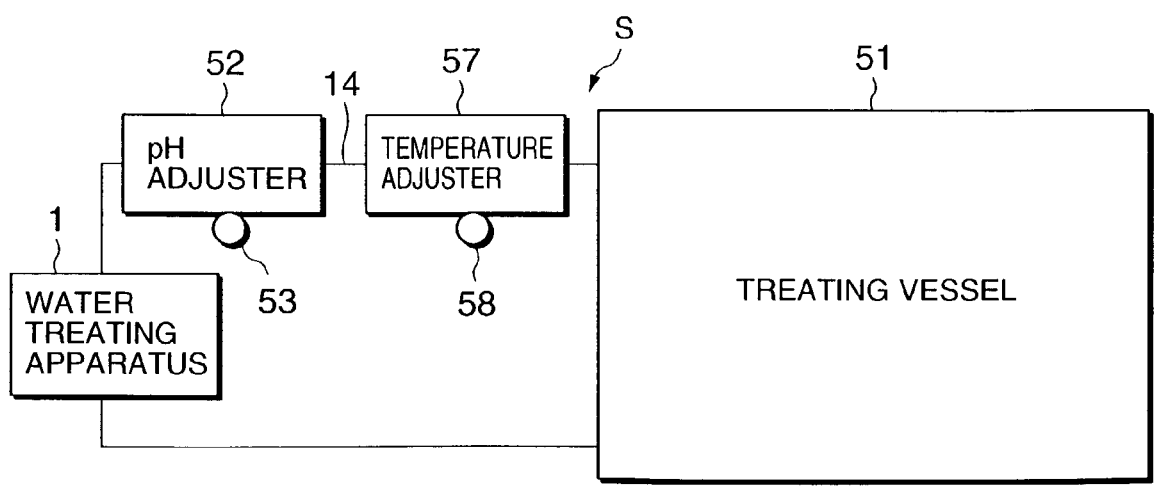
FIG. 6 is a block diagram showing a water treating system according to still another embodiment of the present invention.

On the other hand, as shown in FIG. 6, if the pH adjuster 52 and the temperature adjuster 57 are both connected to the circulation system 14, the efficiency of adsorption to the carbon fiber 8 can be further improved according to the improvement in charging rate of the microorganisms based on the pH adjustment and the improvement in movement of the microorganisms based on the temperature increase.

In the embodiment, the positive potential (+) is applied to the electrode 12 of the carbon fiber 8 and the negative potential (−) is applied to the electrode 11 in the second processing step, and the negative potential (−) is applied to the electrode 12 of the carbon fiber and the positive potential (+) is applied to the electrode 11 in the another second processing step. However, the present invention is not limited thereto. After the first processing step, the second processing step and the another second processing step may be carried out alternately. Specifically, in a processing step (this will be the second processing step) subsequent to the first processing step, the positive potential (+) and the negative potential (−) may be applied to the electrode 12 of the carbon fiber 8 and the electrode 11 alternately, thereby to annihilate those microorganisms whose optimum pH is acidic or alkaline.

Further, in the present invention, if the treatment-object water is set to strong alkalinity or strong acidity, the foregoing second processing step may be omitted.

In the embodiment, the water treating apparatus 1 is provided in the circulation system 14 from the treating vessel 51, and the electrodes 11 and 12 and the carbon fiber 8 are provided in the flow passage of the treatment-object water. However, the present invention is not limited thereto, and the water treating apparatus 1 may be provided directly in the treating vessel 51. In this event, the treatment-object water in the treating vessel 51 flows into the water treating apparatus 1 by forced circulation or natural circulation. Further, in this event, sodium hydroxide is introduced into the treating vessel 51 by the feeder 52A, so that the treating vessel 51 itself is assumed to be a pH adjuster. Further, in the embodiment, the carbon fiber is used as a conductor. However, the present invention is not limited thereto, and any conductor may be used inasmuch as it can collect microorganisms.

In the embodiment, the microorganisms collected to the carbon fiber 8 to be annihilated are discharged into the discharge pipe 21 connected between the inlet 2 of the water treating apparatus 1 and the valve 16, by flowing the treatment-object water into the water treating apparatus 1 via the outlet 4 and flowing it out via the inlet 2. However, it may also be arranged to flow the treatment-object water into the water treating apparatus 1 via the inlet 2 and flow it out via the outlet 4, thereby to wash the carbon fiber 8 (which is netlike to ensure water permeability). Also in this event, the negative potential is applied to the electrode 12 to set the carbon fiber 8 to the negative potential so as to repel the microorganisms charged at the negative potential for peeling them off or facilitating peeling them off, and then the treatment-object water is allowed to flow into the water treating apparatus 1 via the inlet 2.

In the embodiment, sodium hydroxide is added by the feeder to adjust the treatment-object water to be alkaline. However, an agent to be added is not limited thereto, and any agent may be used inasmuch as it can adjust the treatment-object water to be alkaline. Further, in the embodiment, the water treating system of the present invention is applied to the food and drink manufacturing facilities. However, the present invention is not limited thereto. The water treating system may be applied to fish farms for saltwater fish or freshwater fish, thereby to annihilate various germs or microorganisms in salt water or fresh water.

[Effect of the Invention]

Further, in the present invention, the negative potential charging rate of microorganisms generally charged at negative potential can be enhanced by adjusting pH of treatment-object water to be alkaline. By applying positive potential to a conductor, the microorganisms in the treatment-object water can be attracted to the conductor more strongly. As a result, the microorganisms in the treatment-object water can be efficiently adsorbed to the conductor, thereby to be collected and removed.

Further, in the present invention, by increasing the temperature of the treatment-object water, the movement of the microorganisms can be enhanced to improve the rate of adsorption to the conductor. As a result, the microorganisms in the treatment-object water can be efficiently adsorbed to the conductor, thereby to be collected and removed.

Further, in the present invention, the microorganisms whose negative potential charging rate is enhanced as noted above or whose movement is enhanced as noted above, can be strongly attracted to the conductor set to positive potential in the first processing step so as to be efficiently adsorbed and collected to the conductor. Then, in the next second processing step, circulation of the treatment-object water is stopped and the potentials applied to the conductor and the electrode are increased while maintaining the polarities of the potentials applied to the conductor and the electrode as they are, thereby to conduct electrolysis of the treatment-object water. Accordingly, pH of the treatment-object water near the surface of the conductor is lowered to an acidic state, so that pH of the treatment-object water around the microorganisms can be largely deviated from optimum pH of the microorganisms. Further, hypochlorous acid is simultaneously produced on the surface of the conductor. Since the microorganisms are metabolized by enzyme, the microorganisms cause metabolic abnormality in the treatment-object water whose pH is deviated from optimum pH, so that proliferation and heat-resistant properties thereof are largely lowered. This makes it possible to annihilate the microorganisms with a smaller temperature increase. Further, sterilization based on hypochlorous acid is carried out to some extent in the second processing step.

Then, AC voltage is applied across the electrode and the conductor in the third processing step, so that the treatment-object water generates heat. With the temperature increase caused by the heat generation, the microorganisms adsorbed to the conductor and causing the metabolic abnormality due to the treatment-object water being deviated from optimum pH, die out. In this manner, by largely deviating pH of the treatment-object water such as waste water from optimum pH of the microorganisms, the microorganisms can be efficiently adsorbed and exterminated with a smaller temperature increase, thereby to significantly improve the effect of removal of the microorganisms in the treatment-object water.

Further, in the present invention, the microorganisms whose negative potential charging rate is enhanced as noted above or whose movement is enhanced as noted above, can be strongly attracted to the conductor set to positive potential in the first processing step so as to be efficiently adsorbed and collected to the conductor. Then, in the next second processing step, circulation of the treatment-object water is stopped and the potentials applied to the conductor and the electrode are increased while inverting the polarities of the potentials applied to the conductor and the electrode, thereby to conduct electrolysis of the treatment-object water. Accordingly, pH of the treatment-object water near the surface of the conductor is increased to an alkaline state, so that pH of the treatment-object water around the microorganisms can be largely deviated from optimum pH of the microorganisms. Since the microorganisms are metabolized by enzyme, the microorganisms cause metabolic abnormality in the treatment-object water whose pH is deviated from optimum pH, so that proliferation and heat-resistant properties thereof are largely lowered. This makes it possible to annihilate the microorganisms with a smaller temperature increase.

Then, AC voltage is applied across the electrode and the conductor in the third processing step, so that the treatment-object water generates heat. With the temperature increase caused by the heat generation, the microorganisms adsorbed to the conductor and causing the metabolic abnormality due to the treatment-object water being deviated from optimum pH, die out. In this manner, the microorganisms contained in the treatment-object water such as waste water can be efficiently adsorbed and exterminated, thereby to significantly improve the effect of removal of the microorganisms in the treatment-object water.

Further, in the present invention, in the foregoing third processing step, since the treatment-object water is heated by a heater, the treatment-object water quickly increases in temperature due to the heat from the heater, in addition to the heat generation caused by AC voltage applied across the electrode and the conductor. As a result, the microorganisms strongly adsorbed to the conductor can be annihilated more quickly and effectively.

According to the present invention, the microorganisms whose negative potential charging rate is enhanced as noted above or whose movement is enhanced as noted above, can be strongly attracted to the conductor set to positive potential in the first processing step so as to be efficiently adsorbed and collected to the conductor. Then, in the next second processing step, circulation of the treatment-object water is stopped and the potentials applied to the conductor and the electrode are increased while maintaining the polarities of the potentials applied to the conductor and the electrode as they are, thereby to conduct electrolysis of the treatment-object water. Accordingly, pH of the treatment-object water near the surface of the conductor is lowered to an acidic state, so that pH of the treatment-object water around the microorganisms can be largely deviated from optimum pH of the microorganisms. Further, hypochlorous acid is simultaneously produced on the surface of the conductor. Since the microorganisms are metabolized by enzyme, the microorganisms cause metabolic abnormality in the treatment-object water whose pH is deviated from optimum pH, so that proliferation and heat-resistant properties thereof are largely lowered. This makes it possible to annihilate the microorganisms with a smaller temperature increase. Further, sterilization based on hypochlorous acid is carried out to some extent in the second processing step.

Then, the treatment-object water is heated by the heater in the third processing step. With the temperature increase of the treatment-object water caused by this heating, the microorganisms adsorbed to the conductor and causing the metabolic abnormality due to the treatment-object water being deviated from optimum pH, die out. In this manner, by largely deviating pH of the treatment-object water such as waste water from optimum pH of the microorganisms, the microorganisms can be efficiently adsorbed and exterminated with a smaller temperature increase, thereby to significantly improve the effect of removal of the microorganisms in the treatment-object water.

Further, in the present invention, the microorganisms whose negative potential charging rate is enhanced as noted above or whose movement is enhanced as noted above, can be strongly attracted to the conductor set to positive potential in the first processing step so as to be efficiently adsorbed and collected to the conductor. Then, in the next second processing step, circulation of the treatment-object water is stopped and the potentials applied to the conductor and the electrode are increased while inverting the polarities of the potentials applied to the conductor and the electrode, thereby to conduct electrolysis of the treatment-object water. Accordingly, pH of the treatment-object water near the surface of the conductor is increased to an alkaline state, so that pH of the treatment-object water around the microorganisms can be largely deviated from optimum pH of the microorganisms. Since the microorganisms are metabolized by enzyme, the microorganisms cause metabolic abnormality in the treatment-object water whose pH is deviated from optimum pH, so that proliferation and heat-resistant properties thereof are largely lowered. This makes it possible to annihilate the microorganisms with a smaller temperature increase.

Then, the treatment-object water is heated by the heater in the third processing step. With the temperature increase of the treatment-object water caused by this heating, the microorganisms adsorbed to the conductor and causing the metabolic abnormality due to the treatment-object water being deviated from optimum pH, die out. In this manner, the microorganisms contained in the treatment-object water such as waste water can be efficiently adsorbed and exterminated, thereby to significantly improve the effect of removal of the microorganisms in the treatment-object water.

Further, in the present invention, application of the potentials to the electrode and the conductor is stopped in the foregoing third processing step, so that it is possible to reduce as much as possible the power consumption that increases following the energization of the heater.

Further, in the present invention, the electrode is provided on the treatment-object water flow-out side over the conductor, and the heater is provided on the treatment-object water flow-in side under the conductor. Therefore, heating of the treatment-object water by the heater can be carried out smoothly. Further, a bypass passage for the treatment-object water is provided that communicates with the lower side of the conductor and the upper side of the conductor, bypassing the conductor. Thus, the bubbles generated under the conductor due to the heat generation of the heater can be conveyed to the upper side of the conductor via the bypass passage so as to be discharged. Accordingly, it is possible to avoid the inconvenience wherein the bubbles stay under the conductor to impede the treatment of the treatment-object water.

Further, in the present invention, in addition to the foregoing, a pump is provided in the bypass passage for conveying the treatment-object water from the lower side of the conductor to the upper side of the conductor, and the controller operates the pump in the third processing step. Therefore, the bubbles generated under the conductor upon heat generation of the heater can be smoothly conveyed to the upper side of the conductor so as to be discharged.

Further, in the present invention, the lower surface of the conductor is inclined upward toward an inlet of the bypass passage. Therefore, the bubbles generated under the conductor can easily enter the bypass passage, so that the treatment of the bubbles can be performed more smoothly.

Further, in the present invention, the microorganisms collected to the conductor to be exterminated can be washed out after finishing the third processing step. In this event, since the treatment-object water in which the conductor and the electrode are immersed is discharged, the microorganisms adsorbed to the conductor and the electrode can be easily peeled off by the running water. Thus, the conductor and the electrode can be maintained clean.

Further, in the present invention, in addition to the foregoing respective inventions, the conductor is in the form of a porous body, so that the effect of collecting the microorganisms can be significantly improved. According to the present invention, in addition thereto, the conductor is made of carbon fiber, so that the effect of collecting the microorganisms in the first processing step, and the effect of deviating pH of the treatment-object water from optimum pH due to the electrolysis in the second processing step can be improved.

Further, in the present invention, in addition to the foregoing, the carbon fiber forming the conductor is added with noble metal such as palladium, platinum, iridium, tantalum or gold, or an oxide thereof, or a mixture thereof. Therefore, deterioration of the conductor in the form of the carbon fiber can be suppressed to prolong the life thereof, and further, hypochlorous acid can be efficiently produced.

Further, in the present invention, in the third processing step, chlorine and/or ozone is produced at one of the electrode and the conductor, and active oxygen is produced at the other thereof. Therefore, the microorganisms can be annihilated even by chlorine and/or ozone produced due to electrolysis at one of the electrode and the conductor charged at positive potential in the third processing step, and active oxygen produced due to electrolysis at the other thereof charged at negative potential.

Further, in the present invention, the electrode is added with noble metal such as palladium, platinum, iridium, tantalum or gold, or an oxide thereof, or a mixture thereof.

Therefore, the efficiency of producing chlorine and/or ozone, or active oxygen at the electrode can be further improved.

[Chemical Formula 1]

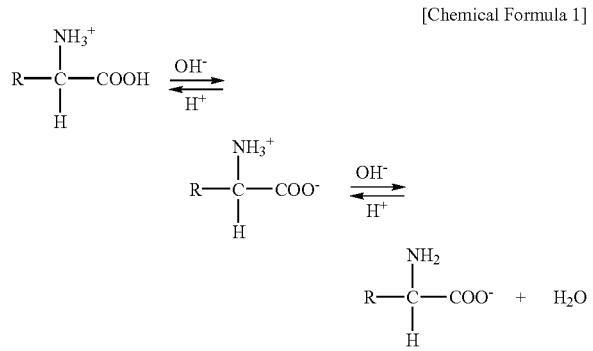

The reason is that, since H⁺ are few in an alkaline solution, H⁺ of protein are separated, so that as alkalinity of the solution increases, the negative potential charging rate of protein increases. On the other hand, since H⁺ are plentiful in an acidic solution, H⁺ are added to protein, so that as acidity increases, the positive potential charging rate of protein increases.

Figure 7:
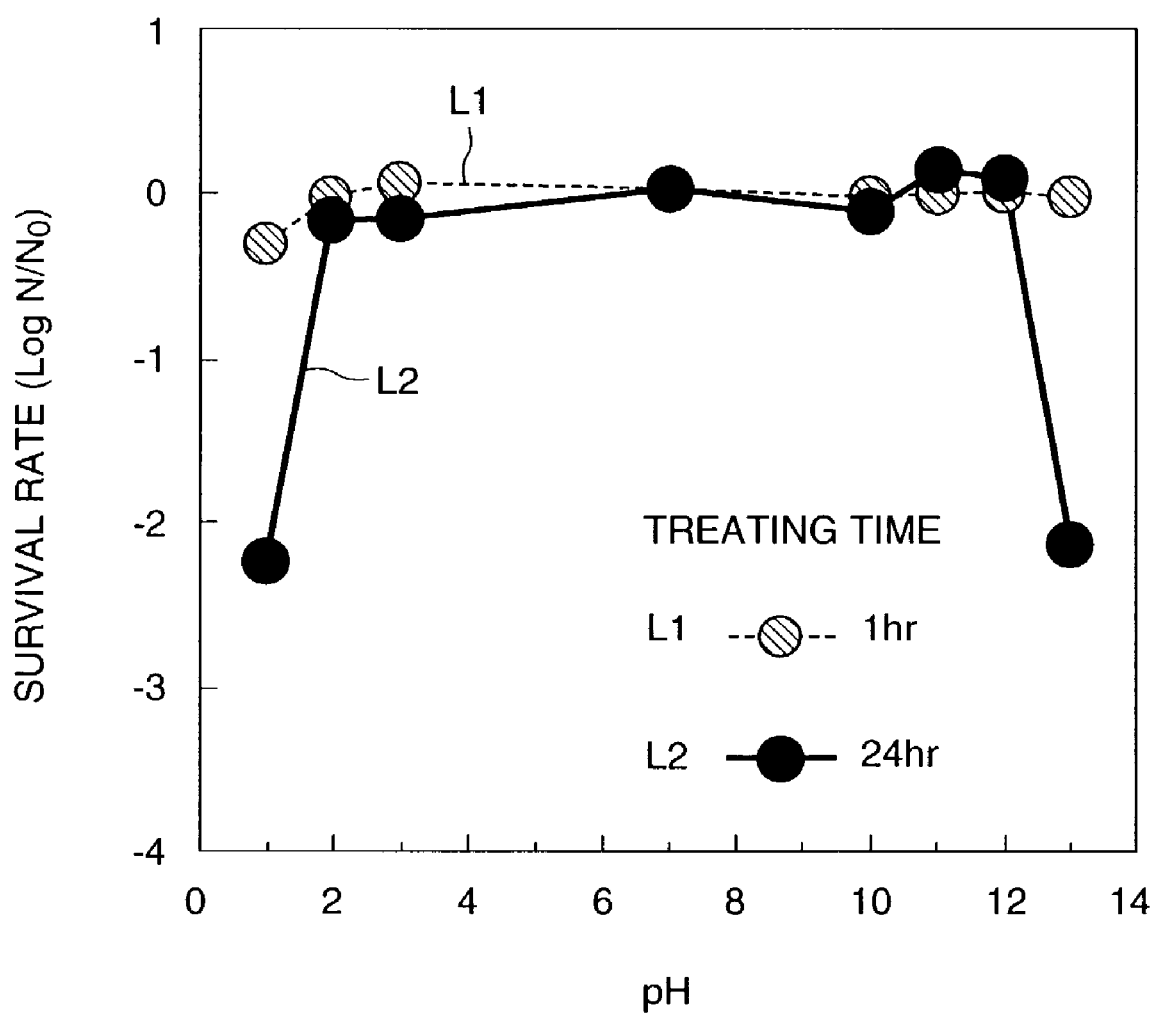
FIG. 7 is a diagram showing the survival rate of spore bacteria against pH.
Figure 8:
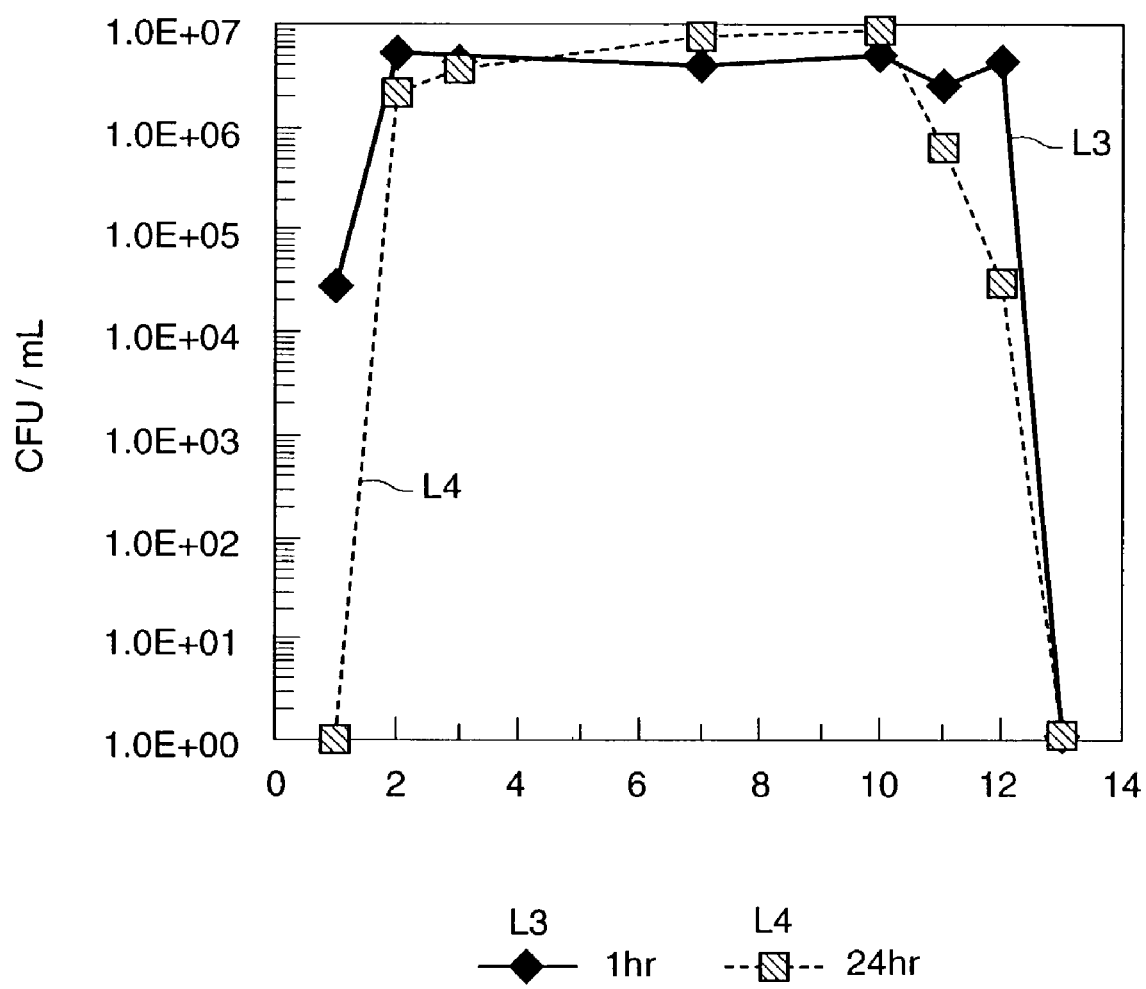
FIG. 8 is a diagram showing the survival rate of yeasts against pH.

On the other hand, spore bacteria and yeasts (microorganisms) do not die out, but can survive even in, for example, strong alkaline or acidic water. FIG. 7 shows the survival rate of spore bacteria, wherein the axis of abscissas represents pH, and wherein L1 shows results after a lapse of one hour, while L2 shows results after a lapse of 24 hours. As clear from FIG. 7, it is seen that spore bacteria can survive even in a strong alkaline state of pH 12 or a strong acidic state of pH 2. FIG. 8 shows the number of bacteria of yeasts in a solution, wherein the axis of abscissas represents pH, and wherein L3 shows results after a lapse of one hour, while L4 shows results after a lapse of 24 hours. As clear from FIG. 8, it is seen that yeasts can also

What is claimed is:

1. A water treating system comprising:
   a casing having an inlet located at a lower end and an outlet located at an upper end;
   a pair of netlike conductive materials being located inside the casing; a first conductive material being located near the inlet and a second conductive material being located near the outlet;
   a filter being centrally located inside the casing, and separating the conductive materials;
   a pH adjuster being located near the inlet; and
   a controller being located externally to the casing;
   wherein the controller controls the application of potentials to the conductive materials; the controller controls the pH adjuster; the pH adjuster adjusts the pH levels of the treatment-object water between pH 2 and pH 11 so that the heat resistance of microorganisms is degraded; the pH adjuster facilitates the adsorption of microorganisms in the treatment-object water to the conductive materials by adjusting the pH levels of the treatment-object water.

2. A water treating system comprising:
   a casing having an inlet located at a lower end and an outlet located at an upper end;
   a pair of netlike conductive materials, the conductive materials being located inside the casing, a first conductive material being located near the inlet and a second conductive material being located near the outlet;
   a filter being centrally located inside the casing, and separating the conductive materials;
   a pH adjuster being located near the inlet; the controller being externally located to the casing;
   a heater being located inside and near the lower end of the casing in a portion underneath the first conductive material where treatment-object water flows in the inlet; and
   a controller
   wherein the controller controls the application of potentials to the conductive materials; the controller adjusts the heater and thereby facilitates the adsorption of microorganisms in the treatment-object water to the conductive materials by adjusting the temperature of the treatment-object water and the conductive materials; the controller controls the pH adjuster; the pH adjuster adjusts the pH levels of the treatment-object water between pH 2 and pH 11 so that the heat resistance of microorganisms is degraded; the pH adjuster facilitates the adsorption of microorganisms in the treatment-object water to the conductive materials by adjusting the pH levels of the treatment-object water.

3. A water treating system according to claim 2, further comprising a bypass pipe connected externally to the casing; the bypass pipe having two ends; a first end of the bypass pipe being connected to the lower end of the casing and below the filter; a second end of the bypass pipe being connected to the upper end of the casing and above the filter
   wherein the bypass pipe transports treatment-object water from the lower end of the casing to the upper end of the casing so that the treatment-object water bypasses the filter.

4. A water treating system according to claim 3, wherein the casing is inclined upward approximately 30 degrees from a vertical axis toward an inlet of said bypass pipe.

5. A water treating system according to claim 3, further comprising a pump; the pump being located in the bypass pipe for transporting treatment-object water from the lower end of the casing to the upper end of the casing;
   wherein the controller controls the pump.

6. A water treating system according to claim 5, further comprising a casing inclined upward approximately 30 degrees from an upright position toward an inlet of said bypass pipe.

* * * * *